United States Patent [19]

Kardach et al.

[11] Patent Number: 5,974,561
[45] Date of Patent: Oct. 26, 1999

[54] METHOD AND APPARATUS FOR GENERATING A RESET SIGNAL WITHIN AN INTEGRATED CIRCUIT

[75] Inventors: James P. Kardach, Saratoga; Gunjeet D. Baweja, Sunnyvale; Chin-Shu Tan, San Jose, all of Calif.

[73] Assignee: Intel Corporation, Santa Clara, Calif.

[21] Appl. No.: 08/938,358

[22] Filed: Sep. 29, 1997

[51] Int. Cl.$^6$ .................................................. G06F 1/04
[52] U.S. Cl. .......................................... 713/500; 713/600
[58] Field of Search .................................. 713/400, 500, 713/600, 601; 714/23

[56] References Cited

U.S. PATENT DOCUMENTS 5,842,028  11/1998  Vajapey ................................... 713/310
5,903,766   5/1999  Walker et al. .......................... 713/323

Primary Examiner—Dennis M. Butler
Attorney, Agent, or Firm—Blakely, Sokoloff, Taylor & Zafman LLP

[57] ABSTRACT

An integrated circuit having a terminal for receiving a first signal, a terminal for receiving a second signal, and circuitry for generating a reset signal is disclosed. The reset signal is asserted based on a transition of the first signal when the second signal is in a predetermined state. In one embodiment the first signal is a suspend clock signal, the second signal is a suspend status signal, and the reset signal is used to reset a resume well within the integrated circuit. Thus, the integrated circuit can be used in a computer system which has a suspend mode with a resume sequence during which the resume well is reset, without requiring that the integrated circuit include an extra terminal for indicating when to reset the resume well.

20 Claims, 7 Drawing Sheets

STATE MACHINE 200

STATE MACHINE 250

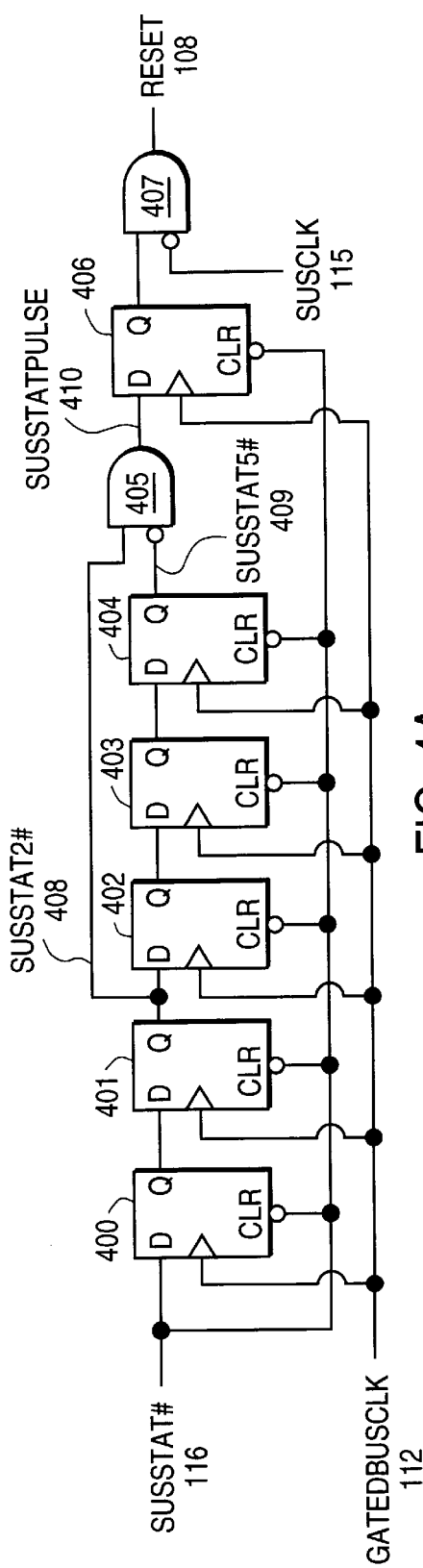
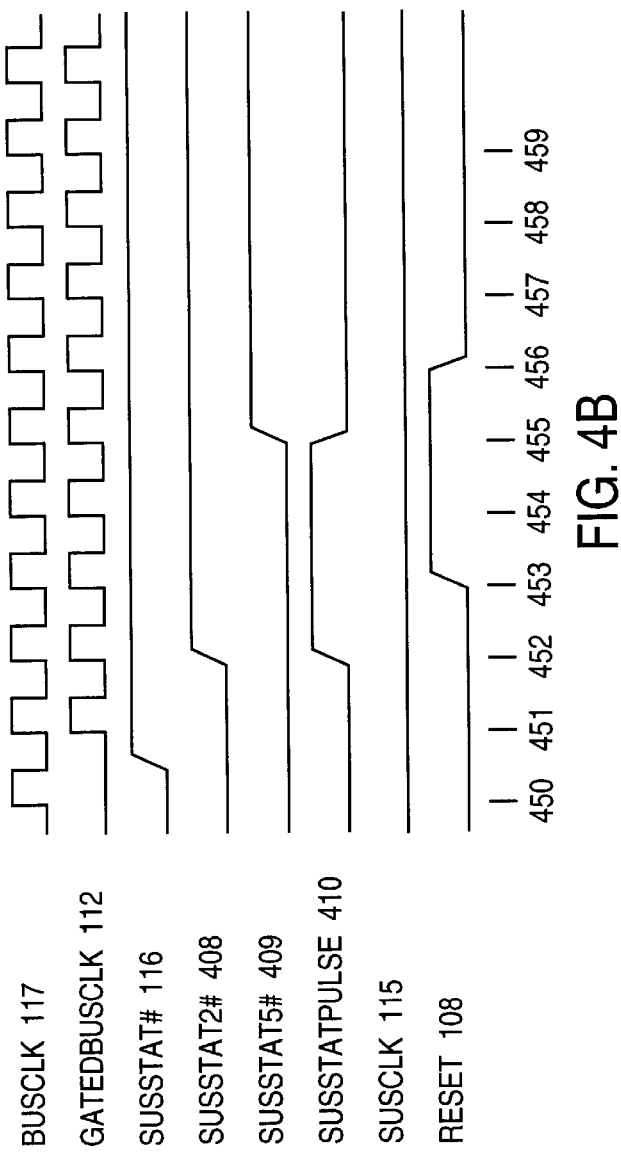
FIG. 4A
FIG. 4B

METHOD AND APPARATUS FOR GENERATING A RESET SIGNAL WITHIN AN INTEGRATED CIRCUIT

FIELD OF THE INVENTION

The present invention relates to the field of integrated circuit design, and in particular, to the field of generating reset signals for integrated circuits.

BACKGROUND OF THE INVENTION

To conserve power while a computer system is temporarily idle without requiring a user to completely shut down the system, many computer systems presently employ one or more suspend modes. Such a suspend mode provides a mechanism for removing power from certain system components and later returning power to those system components without requiring a complete and possibly time consuming reboot of the system.

To implement some suspend modes, it is necessary to continue to supply power to certain system components or portions of certain system components while in suspend. For example, when the system state is stored in the system's dynamic random access memory (DRAM) during suspend (suspend to DRAM), a portion of the DRAM controller, commonly referred to as the resume well, must remain powered in order to refresh the DRAM. To prevent corruption of the DRAM contents when resuming from a suspend to DRAM mode, the circuitry in the resume well is not reset.

However, it is desirable to use the same DRAM controller in a system that additionally or alternatively supports a suspend mode that requires a resume sequence during which the resume well circuitry is reset. For example, if the system state is stored in nonvolatile memory, such as a hard disk, during suspend (suspend to disk), the DRAM and the entire DRAM controller, including the resume well circuitry, can be powered down. In that case, the resume well circuitry must be reset as part of the resume sequence.

A prior approach to using the same DRAM controller to support a suspend to DRAM mode and a suspend to disk mode requires the addition of a pin or other terminal to the DRAM controller for receiving a signal to indicate when the resume well circuitry must be reset. If the DRAM controller is a pad limited integrated circuit (IC), i.e. its minimum die size is constrained by the number of terminal pads, the addition of a terminal will increase die cost. Furthermore, the addition of a terminal to an IC, whether the IC is pad limited or not, often results in a significant increase in package cost and size because the commonly available IC packages have standard, inflexible numbers of terminals.

Therefore, the prior approach to supporting two suspend modes with the same IC by adding a terminal to the IC to receive a reset signal can increase cost and package size two of the major factors in determining IC marketability. A method and apparatus for generating a reset signal within the IC as part of an alternative approach is desired.

SUMMARY OF THE INVENTION

An integrated circuit having a terminal for receiving a first signal, a terminal for receiving a second signal, and circuitry for generating a reset signal is disclosed. The reset signal is asserted based on a transition of the second signal when the first signal is in a predetermined state.

BRIEF DESCRIPTION OF THE DRAWINGS

FIG. 2b shows a state machine used to initialize the state machine of FIG. 2a.

FIG. 4a shows a second embodiment of the reset circuitry of FIG. 1.

FIG. 4b is a timing diagram illustrating the operation of the reset circuitry of FIG. 4a.

DETAILED DESCRIPTION OF A PREFERRED EMBODIMENT

A method and apparatus for generating a reset signal in an integrated circuit is described. In the following description, numerous specific details are set forth in order to provide a thorough understanding of the present invention. It will be apparent, however, to one skilled in the art that the present invention can be practiced without these specific details. These specific details include but are not limited to the polarities of certain signals, the use of certain logic gates to construct circuitry, and the definitions of certain state machine states and transitions. In other instances, some details have been omitted in order to avoid obscuring the present invention.

Figure 1:
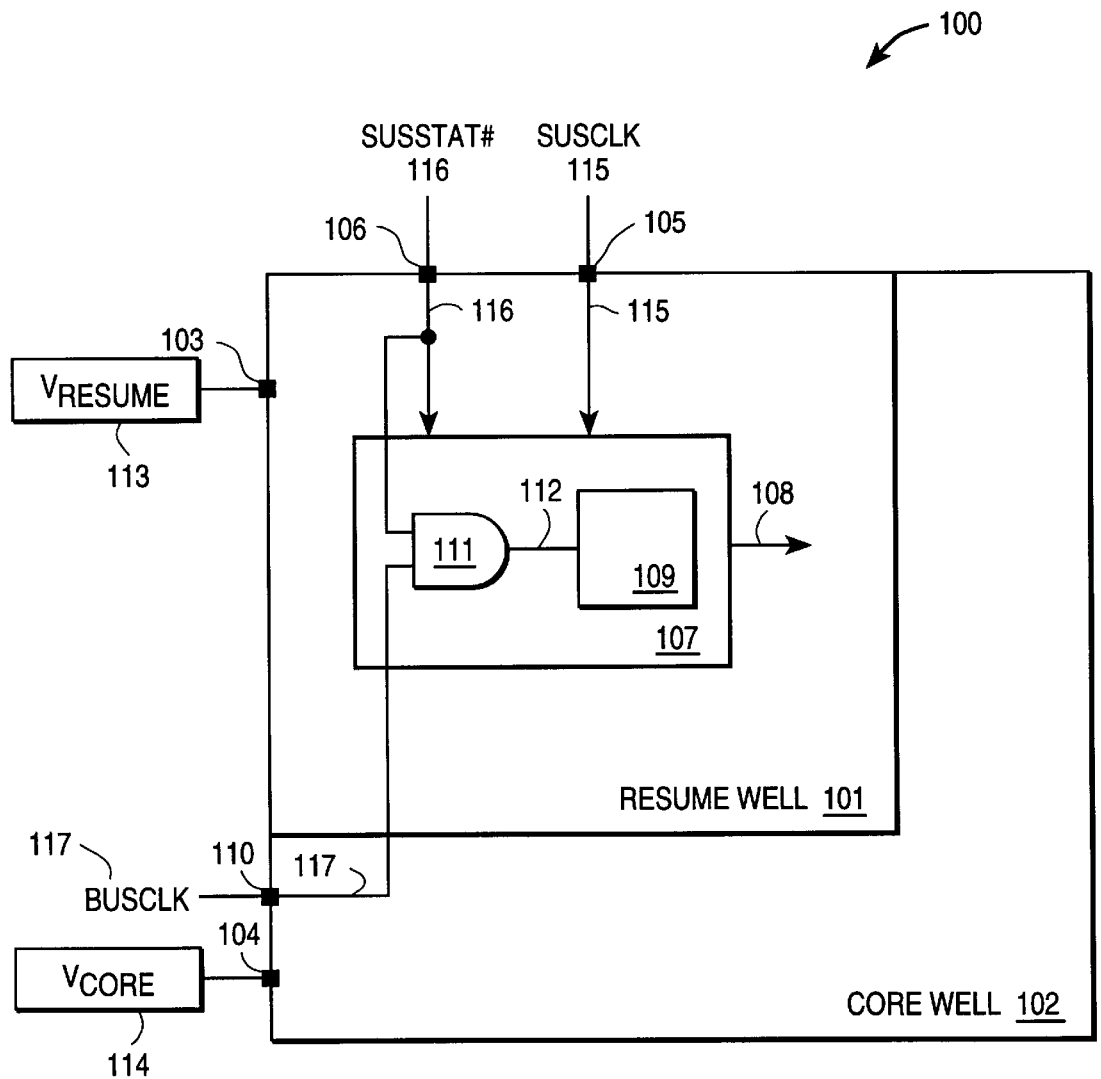
FIG. 1 is a block diagram of an IC including an embodiment of the present invention.

FIG. 1 is a block diagram of IC 100 including an embodiment of the present invention. Although not required within the scope of the present invention, IC 100 has dual voltage wells, resume well 101 and core well 102. In the present context, a voltage well is a portion of an IC including circuitry, all of which receives power from the same power supply.

All circuitry in resume well 101 receives power from power terminal 103 which is connected to external $V_{RESUME}$ power supply 113, and all circuitry in core well 102 receives power from power terminal 104 which is connected to external $V_{CORE}$ power supply 114. Terminals 103 and 104, as well as any other terminal referred to in this specification, can be any part of an IC to which an electrical connection can be made, such as but not limited to a pin, a pad, or a solder bump. $V_{RESUME}$ power supply 113 is electrically isolated from $V_{CORE}$ power supply 114 so that the circuitry in resume well 101 can remain powered even when the circuitry in core well 102 is powered down. Thus, the circuitry in resume well 101 can be used to provide capabilities to a computer system that must be available when the computer system is idle and placed into certain power saving suspend modes. Such capabilities include, but are not limited to, refreshing DRAM and monitoring for events (e.g. interrupts) that require that the system be brought out of a suspend mode.

In addition to the dual well design, two input terminals on IC 100 are provided to support the role of the circuitry in resume well 101 in a computer system with a suspend mode. Both input terminals receive signals that are generated external to IC 100.

The first of these two input terminals is suspend status terminal 106, which receives suspend status signal (SUSSTAT#) 116. SUSSTAT# 116 indicates when the system is entering or exiting a suspend mode. In this embodiment, SUSSTAT# 116 is an active low signal that is asserted when the system enters suspend, remains asserted while the system is in suspend, and is deasserted when the system exits suspend.

The second of the two input terminals is suspend clock terminal 105, which receives suspend clock signal (SUSCLK) 115. SUSCLK 115 can be used to clock any synchronous logic in resume well 101 that must remain operable during certain suspend mode, because SUSCLK 115 continues to toggle during these suspend modes. The frequency of SUSCLK 115 is typically much lower than that of system bus clock signal (BUSCLK) 117, for example 32 KHz as compared to 33 MHz.

Reset circuitry 107 in IC 100 receives SUSCLK 115 and SUSSTAT# 116 and generates reset signal (RESET) 108. One advantage of the present invention is that RESET 108 is generated within IC 100 rather than received from an additional input terminal as required by the prior approach described above. RESET 108 is used to reset the resume well 101. The act of resetting the resume well includes resetting whatever circuitry within the resume well can be reset. RESET 108 is asserted by reset circuitry 107 based on a transition of the suspend status signal when the suspend clock is in a predetermined state. For example, in this embodiment RESET 108 is asserted based on a deassertion of SUSSTAT# 116 when SUSCLK 115 is low.

In the embodiment of FIG. 1, reset circuitry 107 includes synchronous logic 109 responsive to a clock signal derived from externally generated BUSCLK 117 received from a third input terminal, system bus clock terminal 110. Like terminals 105 and 106, system bus clock terminal 110 does not add to the total number of terminals of IC 100 because BUSCLK 117 is typically needed by IC 100 for purposes other than resetting resume well 101. However, it is not beyond the scope of the present invention to use another clock to clock synchronous logic 109.

One advantage of using a clock signal derived from BUSCLK 117 is that the frequency of BUSCLK 117 is typically much greater than that of SUSCLK 115. This frequency difference allows the design of the external source of SUSSTAT# 116 to guarantee that IC 100 generates RESET 108 correctly even if SUSSTAT# 116 is delayed within IC 100. In this embodiment, BUSCLK 117 is approximately one thousand times faster than SUSCLK 115. Then, to exit suspend without resetting the circuitry in resume well 101, the external source of SUSTAT# 116 waits for a rising edge of SUSCLK 115 before deasserting SUSSTAT# 116. That way, SUSCLK 115 stays high for roughly five hundred periods of BUSCLK 117 after SUSSTAT# 116 is deasserted, guaranteeing that the reset circuitry 107 does not assert RESET 108 even if SUSSTAT# 116 is delayed within IC 100.

Although it is within the scope of the present invention to use BUSCLK 117 directly from input terminal 110 to clock synchronous logic 109, it is preferable to use a gated version of BUSCLK 117 to prevent leakage from $V_{RESUME}$ power supply 113 when the power to drive BUSCLK 117 is removed. In this embodiment, gating logic 111 is used to produce gated system bus clock signal (GATEDBUSCLK) 112. Gating logic 111 is an AND gate having BUSCLK signal 117 as one input and SUSSTAT# 116 as the other input. Therefore, GATEDBUSCLK 112 is held at the ground potential of $V_{RESUME}$ power supply 113 whenever SUSSTAT# 116 is asserted.

Figure 2B:
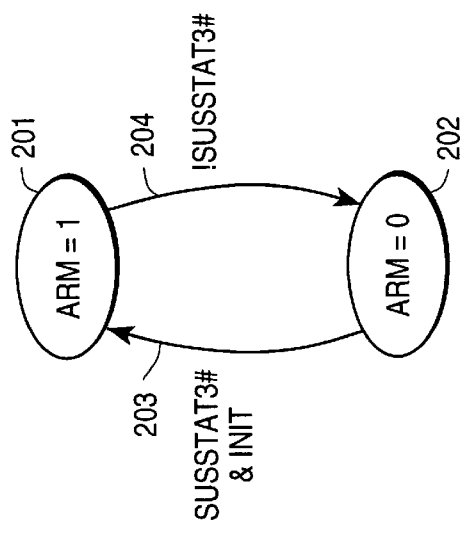
Figure 2A:
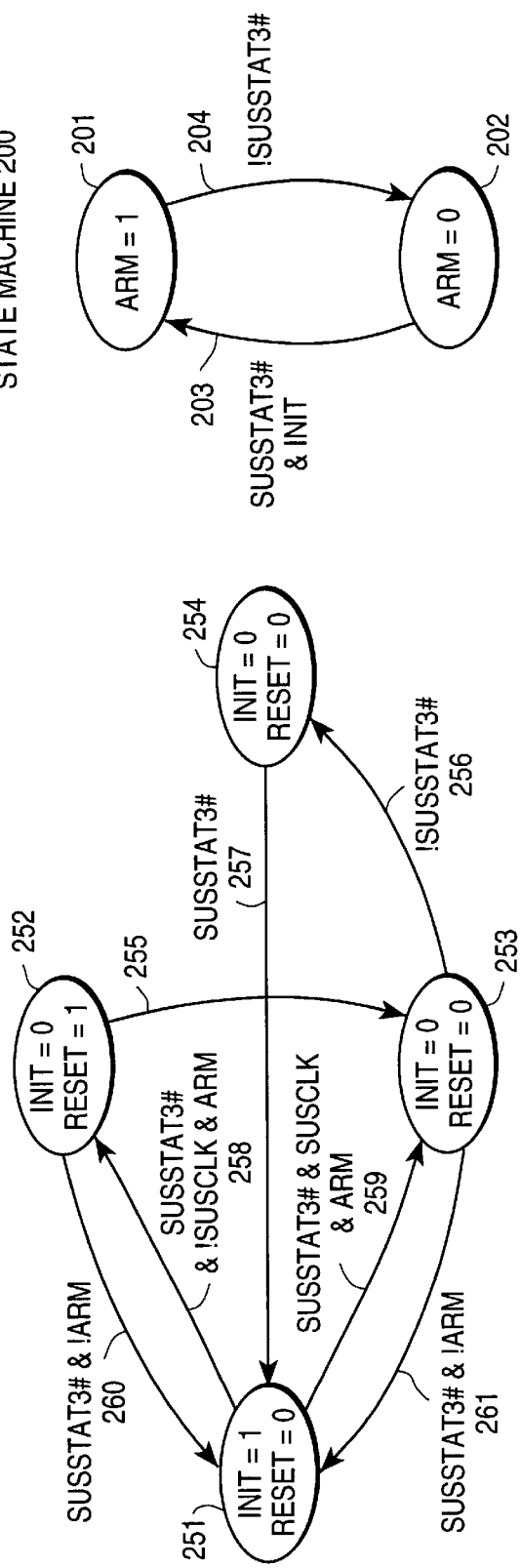
FIG. 2a shows a state machine used to generate the reset signal in a first embodiment of the reset circuitry of FIG. 1.
Figure 2C:
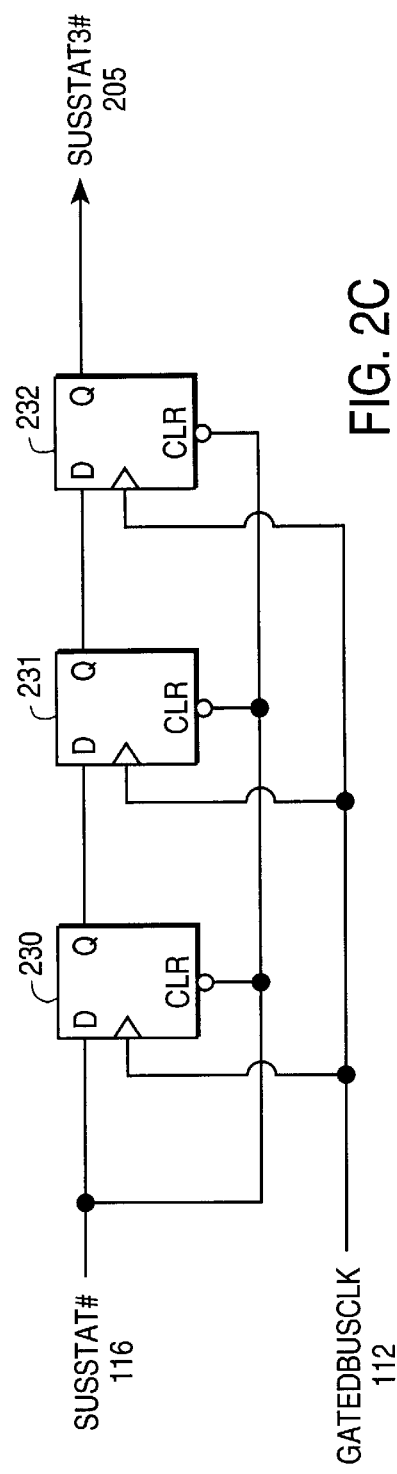
FIG. 2c shows three flip-flops used to delay a signal to the state machine of FIG. 2b.
Figure 3A:
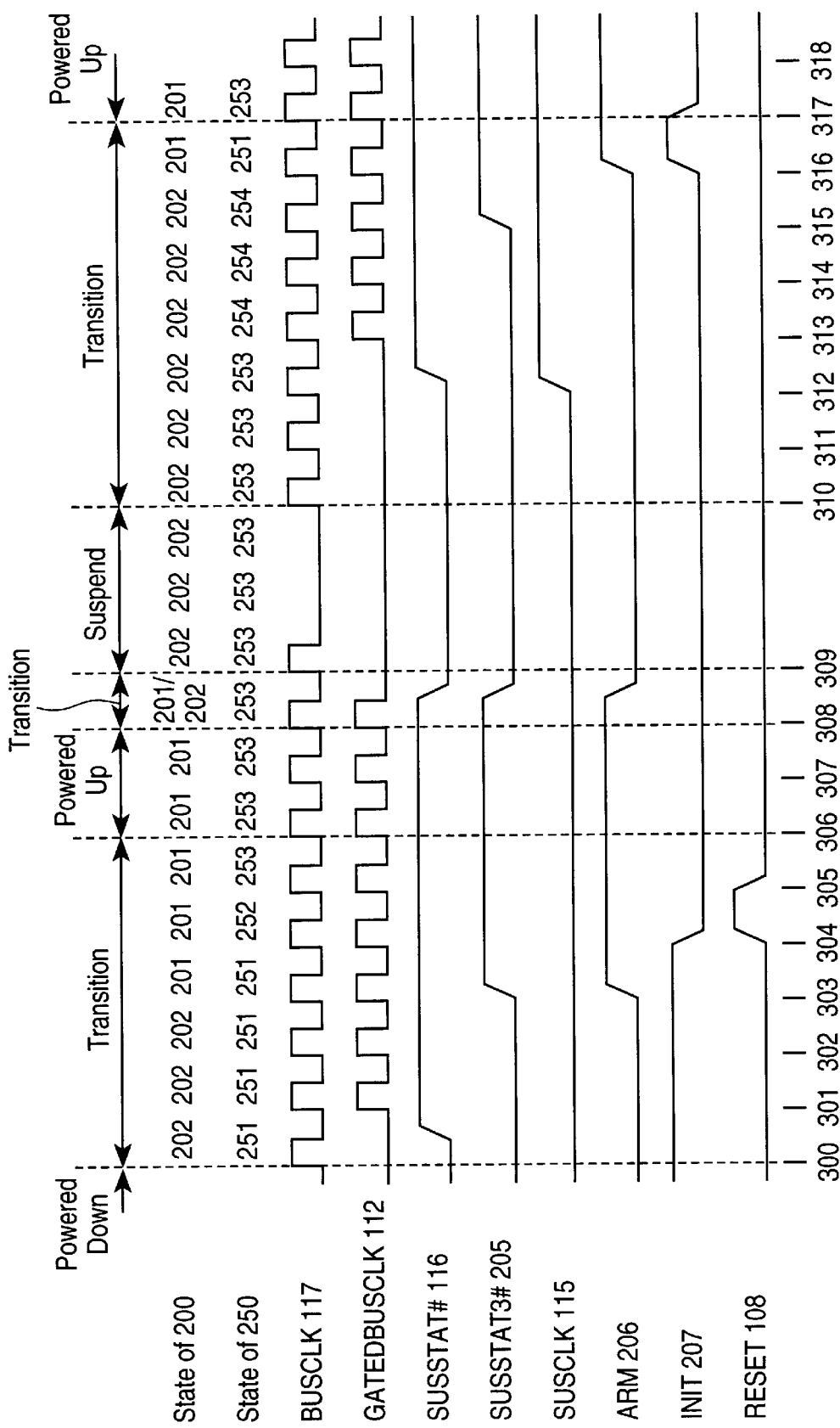
FIG. 3a is a first timing diagram illustrating the operation of the state machines of FIGS. 2a and 2b.
Figure 3B:
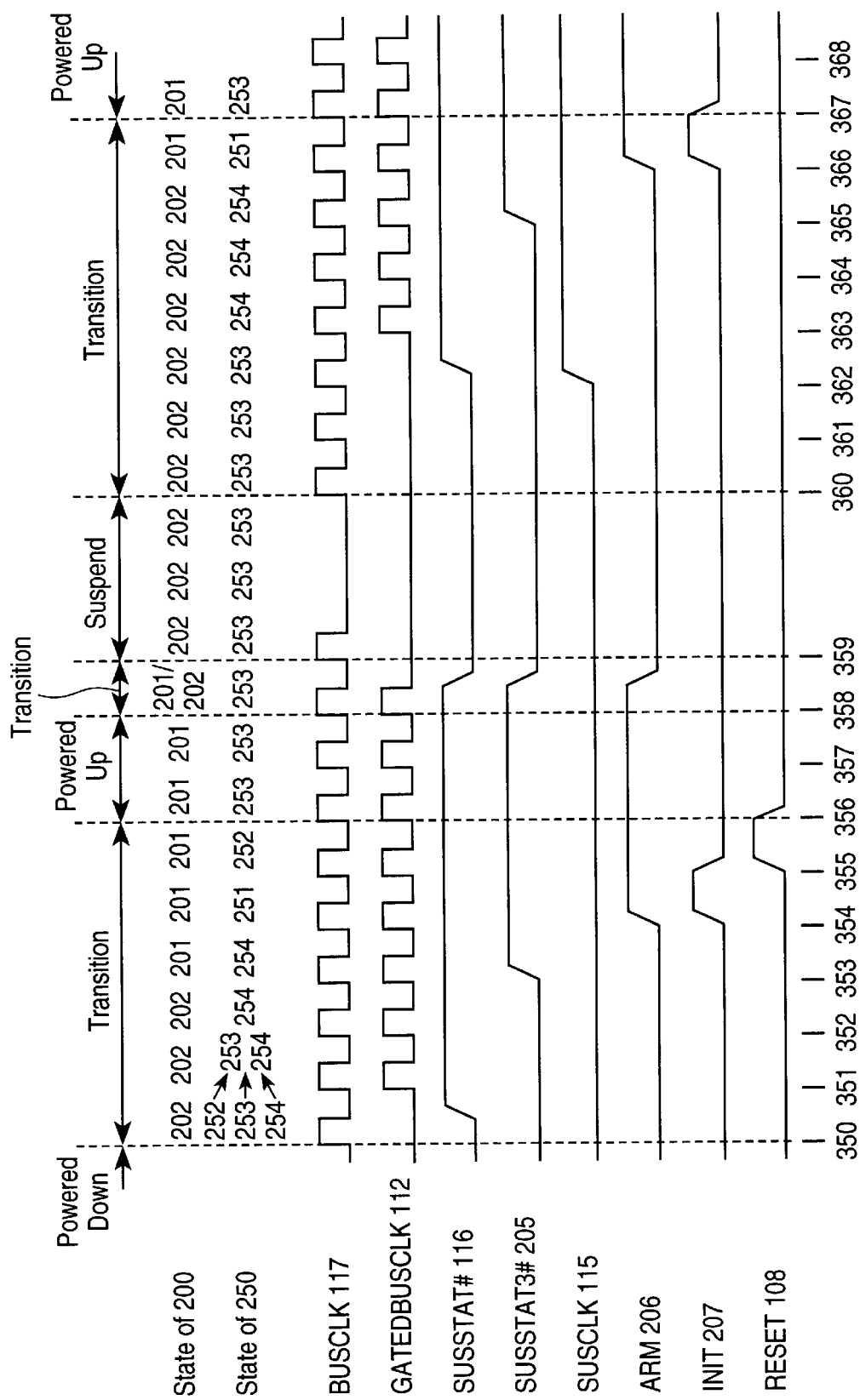
FIG. 3b is a second timing diagram illustrating the operation of the state machines of FIGS. 2a and 2b.

FIGS. 2a, 2b, and 2c illustrates an embodiment of reset circuitry 107 using two state machines plus three D flip-flops. State machine 200 in FIG. 2b is asynchronous and is used to initialize state machine 250 in FIG. 2a. State machine 250 is clocked with the rising edge of clock signal 112 and is used to generate reset signal 108. FIG. 2c shows three D flip-flops used to delay the suspend status signal. FIGS. 3a and 3b are timing diagrams illustrating the operation of state machines 200 and 250.

In FIGS. 2a, 2b, 2c, 3a and 3b, SUSSTAT3# 205 corresponds to the delayed version of SUSSTAT# 116 generated as shown in FIG. 2c. ARM 206 corresponds to the sole output signal of state machine 200. ARM 206 is an active high signal and is asserted when state machine 200 is in state 201 and deasserted when state machine 200 is in state 202. INIT 207 corresponds to an active high output signal of state machine 250. INIT 207 is asserted when state machine 250 is in state 251 and deasserted when state machine 250 is in any of states 252, 253, or 254. RESET 108 is another active high output of state machine 250. RESET 108 is asserted when state machine 250 is in state 252 and deasserted when state machine 250 is in any of states 251, 253, or 254.

FIGS. 3a and 3b illustrate the operation of state machines 200 and 251 through a sequence of system state transitions. In order to simplify the illustration, the number of BUSCLK 117 periods shown in each transition and the number of BUSCLK 117 periods that the system is shown to be in each state are far fewer than that which would be present in normal operation. One effect of this simplification is that FIGS. 3a and 3b do not show the toggling of SUSCLK 115 when the system is on. Another effect is that less time is shown between BUSCLK 117 starting after suspend and SUSSTAT# 116 being deasserted than would be expected in typical operation.

The first system state transition in both FIGS. 3a and 3b is from a system state where no power is applied to resume well 101, for example a powered down state or a suspend to disk state, to a powered up state. During this transition resume well 101 must be reset. The external source of SUSCLK 115 and SUSTAT# 116 typically holds both signals low at least until after BUSCLK 117 begins to toggle in order to properly initialize the system.

As GATEDBUSCLK 112 does not toggle until after SUSSTAT# 116 is deasserted, it is desirable to provide a delayed version of SUSSTAT# 116 to allow time for state machine 250 to initialize. To provide such a delayed version of SUSSTAT# 116, three D type flip-flops 230, 231, and 232, connected output to input, clocked with GATEDBUSCLK 112, and asynchronously cleared when SUSSTAT# 116 is asserted, as shown in FIG. 2c, can be used. The output signal, SUSSTAT# 205 is deasserted between two and three BUSCLK 117 periods after SUSSTAT# 116 is deasserted. Therefore, state machine 250 is provided with at least three rising edges of GATEDBUSCLK 112 for initialization. however, any number of rising edges, including zero, could be provided within the scope of the present invention.

Returning to FIGS. 2a, 2b, 3a and 3b, when power is applied to state machines 200 and 250, they can power up in any state. If state machine 200 powers up in state 202, it stays in state 202 at least until SUSSTAT3# 205 is deasserted. If state machine 200 powers up in state 201, it immediately enters state 202 via arc 204 because SUSSTAT3# 205 is asserted, and stays in state 202 at least until SUSSTAT3# 205 is deasserted. If state machine 250 powers up in state 251, as shown in FIG. 3a, or state 254, as shown in FIG. 3b, it will stay in the state in which it powered up at least until SUSSTAT3# 205 is deasserted. If state machine 250 powers up in state 252, as shown in FIG. 3b, it will enter state 253 at time 351 via arc 255, enter state 254 at time 352 via arc 256, and stay in state 254 at least until SUSSTAT3# 205 is deasserted. If state machine 250 powers up in state 253, as shown in FIG. 3b, it will enter state 254 at time 351 via arc 256 and stay there at least until SUSSTAT3# 205 is deasserted.

During the BUSCLK 117 periods beginning at time 300 in FIG. 3a and time 350 in FIG. 3b, the system logic responsible for driving SUSSTAT# 116 deasserts SUSSTAT# 116 to indicate that the system is powering up. Therefore, at times 303 and 353, SUSSTAT3# 205 is deasserted.

Focusing now on FIG. 3a, at time 303 state machine 250 is in state 251 and INIT 207 is asserted.Therefore, the deassertion of SUSTAT3# 205 at time 303 results in state machine 200 entering state 201 via arc 203 and asserting ARM 206. Then, at time 304, state machine 250 enters state 252 via arc 258. In state 252, state machine 250 asserts RESET 108 to reset resume well 101, as is appropriate for this system state transition. Then, at time 305, state machine 250 enters state 253 via arc 255, and stays there at least until SUSSTAT3# 205 is asserted.

Turning now to FIG. 3b, the deassertion of SUSTAT3# 205 at time 353 results in state machine 250 entering state 251 via arc 257 at time 354 and asserting INIT 207. The assertion of INIT 207 causes state machine 200 to enter state 201 via arc 203 and assert ARM 206. Then, at time 355, state machine 250 enters state 252 via arc 258. In state 252, state machine 250 asserts RESET 108 to reset resume well 101, as is appropriate for this system state transition. Then, at time 356, state machine 250 enters state 253 via arc 255, and stays there at least until SUSSTAT3# 205 is asserted. After time 356, FIG. 3b is identical to FIG. 3a after time 306. Therefore, the remainder of the description of the operation of state machines 200 and 250 will focus on FIG. 3a.

From time 306 until time 308, the system is powered up. State machine 200 is in state 201 and state machine 250 is in state 253. The next system state transition shown in FIG. 3 is from a powered up state to a suspend mode in which the resume well 101 remains powered, for example, suspend to DRAM. During the BUSCLK 117 period beginning at time 308, the system logic responsible for driving SUSSTAT# 116 asserts SUSSTAT# 116 to indicate that the system is entering suspend. The assertion of SUSSTAT# 116 causes GATEDBUSCLK 112 to be held low and SUSSTAT3# 205 to be asserted. State machine 200 immediately enters state 202 via arc 204. State machine 250 stays in state 253 until the next rising edge of GATEDBUSCLK 112.

From time 309 to time 310 the system is in a suspend mode in which power remains applied to resume well 101. Typically during such a suspend mode BUSCLK 117 is stopped. SUSCLK 115 typically remains toggling in such a suspend mode, however, due to the simplification of FIG. 3a explained above, the toggling of SUSCLK 115 is not shown in FIG. 3a.

The next system state transition shown in FIG. 3a is from a suspend mode in which resume well 101 is powered to a powered up state. During this transition resume well 101 must not be reset. Therefore, the system logic responsible for driving SUSSTAT# 116 waits for a rising edge of SUSCLK 115 before deasserting SUSSTAT# 116 to indicate that the system is exiting suspend. Consequently, as described in the following paragraph, resume well 101 is not reset.

At time 310 BUSCLK 117 is started. During the BUSCLK 117 period beginning at time 312 SUSCLK 115 goes high, and then SUSSTAT# 116 is deasserted. At time 313, GATEDBUSCLK 112 begins to toggle and state machine 250 enters state 254 via arc 256. At time 315, SUSSTAT3# 205 is deasserted. At time 316, state machine 250 enters state 251 via arc 257. State machine 250 asserts INIT 207 in state 251, causing state machine 200 to enter state 201 via arc 203. State machine 200 asserts ARM 206 in state 203, causing state machine 250 to enter state 253 via arc 259 at time 317. State machine 250 does not assert RESET 108 in state 253; therefore, resume well 101 is not reset.

Thus, FIGS. 3a and 3b illustrate the operation of state machines 200 and 250 when resume well 101 must be reset and when resume well 101 must not be reset. However, neither FIG. 3a nor 3b showed the conditions under which state machine 250 would change state via arc 260 or 261. These arcs are provided to guarantee proper initialization of state machine 250 even if BUSCLK 117 does not start toggling until after SUSSTAT# 116 is deasserted. In such a case, if state machine 250 powers up in state 251 or 254, then its behavior is the same as in FIG. 3a or 3b respectively. However, if state machine 250 powers up in state 252 or 253, then state machine 250 enters state 251 via arc 260 or 261, respectively, on the first rising edge of GATEDBUSCLK 112.

Another embodiment of reset circuitry 107 is shown in FIG. 4a. SUSSTAT# 116 is coupled to the input of a chain of five output-to-input coupled D type flip-flops 400, 401, 402, 403, and 404. The output of flip-flop 401, SUSSTAT2# 408, and the output of flip-flop 404, SUSSTAT5# 409, are combined in combinatorial gate 405 to produce SUSSTATPULSE 410. SUSSTATPULSE 410 is coupled to the input to D type flip-flop 406, the output of which is coupled to one input of combinatorial gate 407. The other input of combinatorial gate 407 is coupled to SUSCLK 115 and the output is coupled to RESET 108. Flip-flops 400, 401, 402, 403, 404, and 406 are all clocked with GATEDBUSCLK 112, and asynchronously cleared when SUSSTAT# 116 is asserted.

The operation of the circuit of FIG. 4a to reset resume well 101 is illustrated with the timing diagram of FIG. 4b. Prior to time 450 resume well 101 and the suspend clock are powered down. During the BUSCLK 117 period beginning at time 450 SUSSTAT# 116 is deasserted to indicate that the system is powering up. On the second rising edge of GATEDBUSCLK 112, at time 452, SUSSTAT2# 408 goes high, and on the fifth rising edge of GATEDBUSCLK 112, at time 455 SUSSTAT5# 409 ooes high. When SUSSTAT2# 408 is high but SUSSTAT5# 409 is low, approximately between times 452 and 455, SUSSTAPULSE 410 is high. The high level on SUSSTATPULSE 410 propagates through flip-flop 406, then through gate 407 because SUSCLK 115 remains low. RESET 108 goes high for three BUSCLK 117 periods starting at time 453 to reset resume well 101.

In order to deassert SUSSTAT# 116 without resetting the resume well 101, the logic responsible for driving SUSSTAT# 116 is designed to deassert SUSSTAT# 116 based on a rising edge of SUSCLK 115. Then, the high level on SUSSTATPULSE 410 will not propagate through gate 407 and RESET 108 will not go high. Also, in the preceding description it was assumed that SUSCLK 115 was not started until after resume well 101 was reset. If that is not the case, then the logic responsible for driving SUSSTAT# 116 can be designed to deassert SUSSTAT# 116 based on a falling edge of SUSCLK 115 to ensure that SUSCI,K 115 does not go high during the reset process.

Figure 5:
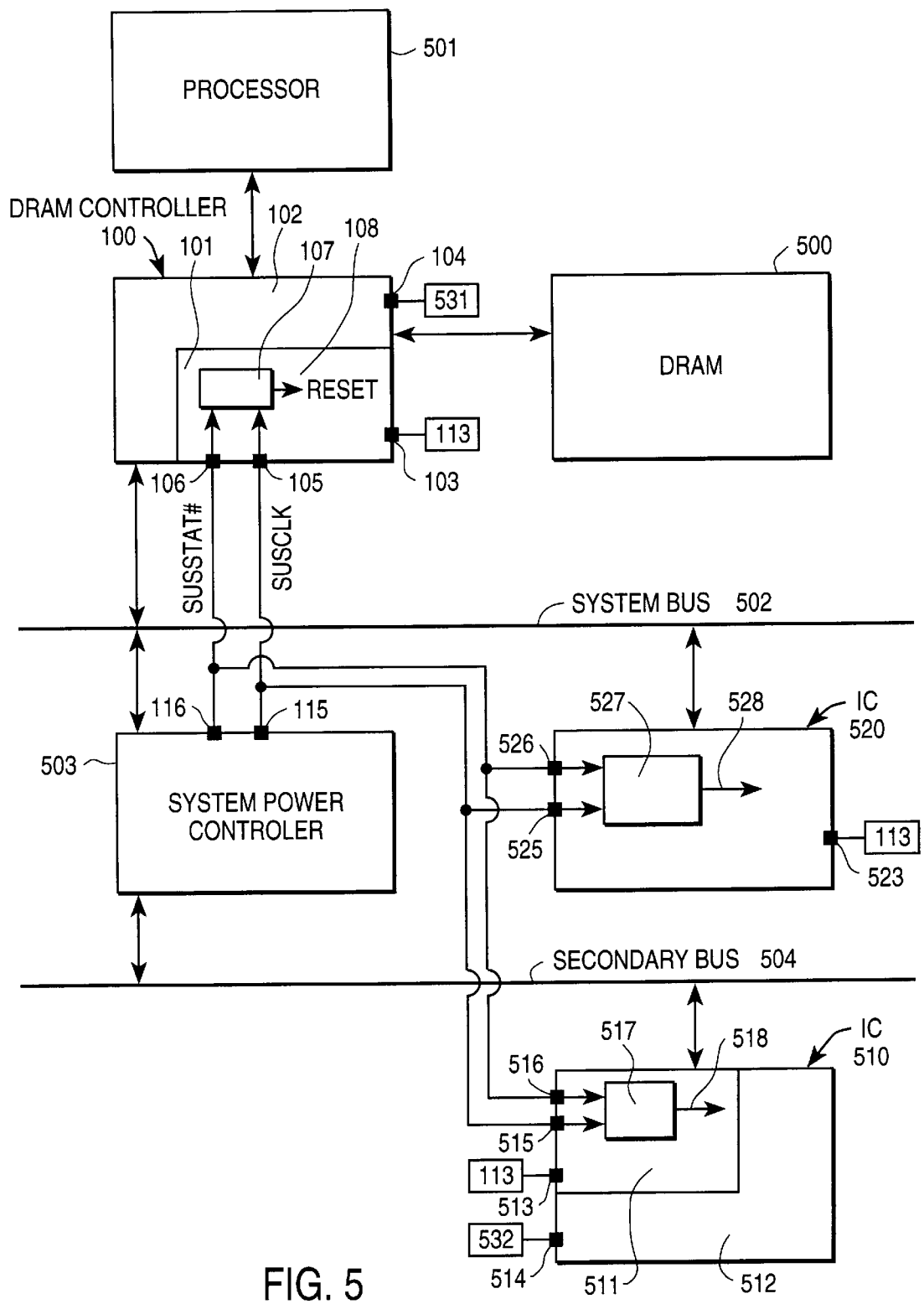
FIG. 5 is a block diagram of a computer system including an embodiment of the present invention.

Turning now to FIG. 5, an embodiment of the present invention in a computer system is illustrated. In the computer system of FIG. 5, IC 100 is used as a controller for DRAM 500 and as a bridge between processor 501 and system bus 502. However, IC 100 can have alternative or addition uses within the scope of the present invention. IC 100 has dual voltage wells, resume well 101 and core well 102. All circuitry in resume well 101 receives power from power terminal 103 which is connected to $V_{RESUME}$ power supply 113, and all circuitry in core well 102 receives power from power terminal 104 which is connected to $V_{CORE1}$ power supply 531.

FIG. 5 also shows IC 503 residing on system bus 502. However IC 503 can reside elsewhere, such as on a secondary bus. In the computer system of FIG. 5, IC 503 is used as a system power controller and bridge between system bus 502 and secondary bus 504 however, IC 503 can have alternative or addition uses within the scope of the present invention. As one of its functions as a system power controller, IC 503 generates SUSSTAT# 116, which is supplied to IC 100 via input terminal 106. IC 503 is also a clock source in that it generates SUSCI,K 115; however, SUSCLK 115 can be generated by another clock source, for example, a discrete real time clock IC. SUSCLK 115 is supplied to IC 100 via input terminal 105.

Within IC 100, reset circuitry 107 generates RESET 108 to reset resume well 101. RESET 108 is asserted by reset circuitry 107 based on a transition of SUSSTAT# 116 when SUSCLK 115 is in a predetermined state. For example, in one embodiment RESET 108 is asserted based on a deassertion the SUSSTAT# 116 when SUSCLK 115 is low. If desired, one of the previously described embodiments of reset circuitry 107 can be used.

FIG. 5 also shows IC 510 residing on secondary bus 504, however, IC 510 can reside anywhere in the system within the scope of the present invention. Like IC 100, IC 510 has dual voltage wells, resume well 511 and core well 512. All circuitry in resume well 511 receives power from power terminal 513 which is connected to $V_{RESUME}$ power supply 113, and all circuitry in core well 512 receives power from power terminal 514 which is connected to $V_{CORE2}$ power supply 532. Note that $V_{CORE1}$ power supply 531 and $V_{CORE2}$ power supply 532 can be the same power supply within the scope of the present invention.

Within IC 510, reset circuitry 517 generates reset signal 518 to reset the circuitry in resume well 511. Reset signal 518 is asserted by reset circuitry 517 based on a transition of SUSSTAT# 116, received through input terminal 516, when SUSCLK 115, received through input terminal 515, is in a predetermined state. For example, in one embodiment reset signal 518 is asserted based on a deassertion of SUSSTAT # 116 when SUSCLK 115 is low. If desired, one of the previously described embodiments of reset circuitry 107 can be used for reset circuitry 517.

FIG. 5 also shows IC 520 residing on system bus 502, however, IC 520 can reside anywhere in the system within the scope of the present invention. All circuitry in IC 520 receives power from power terminal 523 which is connected to $V_{RESUME}$ power supply 113. Within IC 520, reset circuitry 527 generates reset signal 528 to reset IC 520. Reset signal 528 is asserted by reset circuitry 527 based on a transition of SUSSTAT# 116, received through input terminal 526, when SUSCLK 115, received through input terminal 525, is in a predetermined state. For example, in one embodiment, reset signal 528 is asserted based on a deassertion of SUSSTAT# 116 when SUSCLK 115 is low. If desired, one of the previously described embodiments of reset circuitry 107 can be used for reset circuitry 527.

Figure 6:
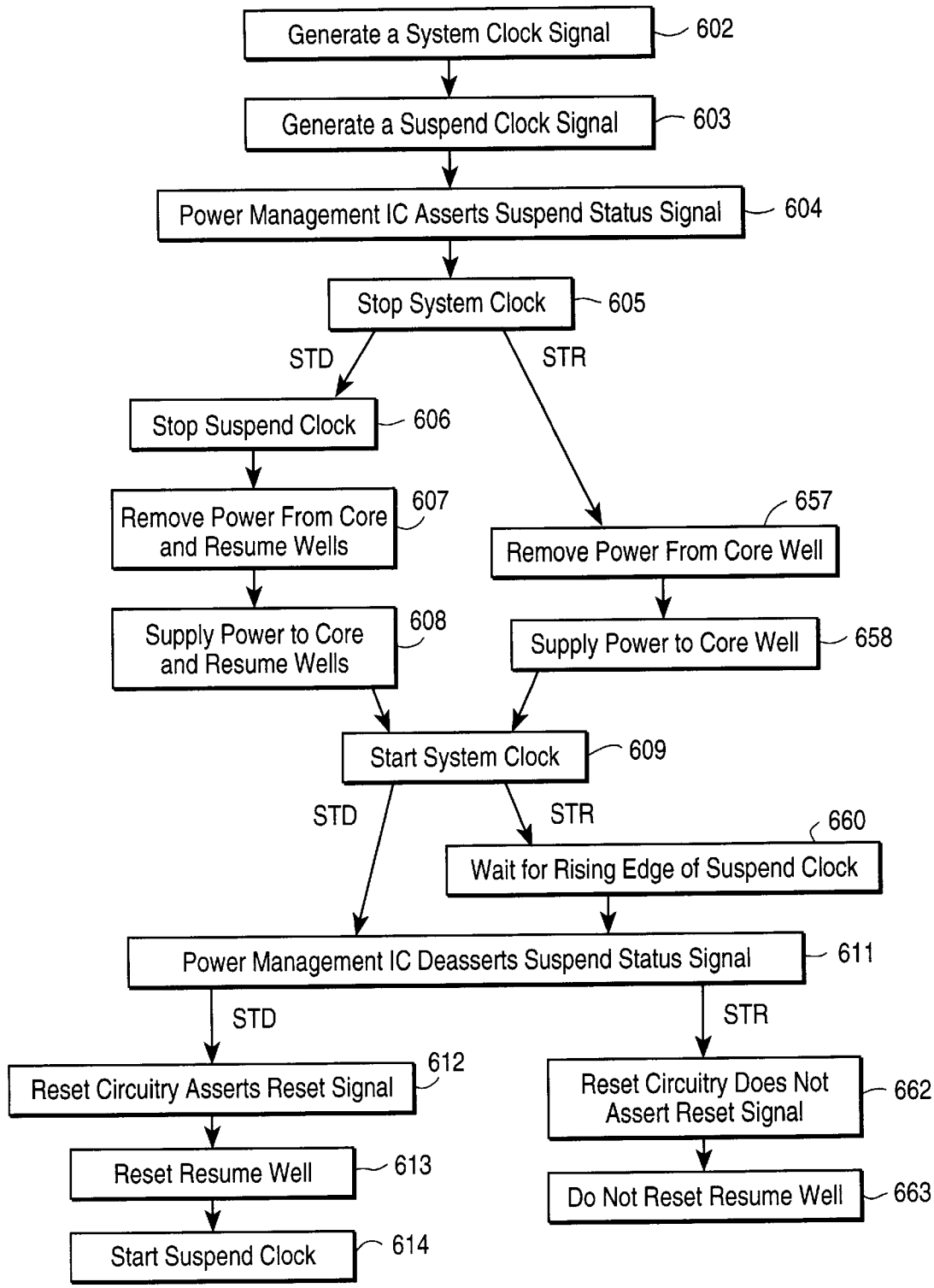
FIG. 6a is a flow chart illustrating an embodiment of the present invention in a method of suspending and resuming a computer system having an IC with a resume well.

Finally, FIG. 6 is flow chart illustrating an embodiment of the present invention in a method of suspending and resuming a computer system having a first IC with a core well and a resume well. In step 602, a system clock signal, for example a 33 MHz clock signal, is generateded in the computer system. In step 603, a suspend clock signal, for example a 32 KHz clock signal, is generateded in the computer system.

In step 604, a second IC, for example a power management IC, asserts a suspend status signal to indicate that the system is entering suspend. In step 605, the system clock is stopped in a low state. When the system is going into a suspend mode, such as suspend to disk (STD), in which power is removed from the circuitry in the resume well, the suspend clock is stopped in a low state as shown in step 606. However, if the system is Going into a suspend mode, such as suspend to DRAM (STR), in which power is not removed from the the circuitry in the resume well, the suspend clock is not stopped. In step 607 in the STD flow, power is removed from both the core well and resume well. In contrast, in step 657 in the STR flow, power is removed from the core well but not the resume well. At this point in both flows the system is in suspend.

To begin to resume the system in the STD flow, power is supplied to both the core well and resume well, as stated in step 608. In contrast, to resume the system in the STR flow, power is supplied to the core well but there is no change to the status of the power to the resume well, as stated in step 658. In step 609, the system clock is started.

Focusing now on the remainder of the STD flow, in step 611 the second IC deasserts the suspend status signal. Note that this change in the state of the suspend status signal when the suspend clock is in a predetermined state, which is low for the purposes of this exemplary method, causes reset circuitry in the first IC to assert a reset signal, as stated in step 612. Then, in step 613, the reset signal is used to reset the resume well. Finally, in step 614, the suspend clock is started. It is also possible within the scope of the present invention to start the suspend clock before the second IC deasserts the suspend status signal, then waiting for a falling edge of the suspend clock before deasserting the suspend status signal.

In comparison, in the remainder of the STR flow, in step 660 the second IC waits for a rising edge of the suspend clock. Then, in step 611 the second IC deasserts the suspend status signal. Note that this change in the suspend status signal occurs when the suspend clock is not in the predetermined state. Therefore, in step 662 the reset circuitry of the first IC does not assert the reset signal, and in step 663 the resume well is not reset.

Thus, several exemplary embodiments of the apparatus and method of the present invention have been described. However, the invention is not limited to these embodiments or the details that have been provided to best describe these embodiments. The specification and drawings must be regarded in an illustrative rather than a restrictive sense. The scope of the invention is defined by the following claims.

What is claimed is:

1. An integrated circuit comprising:
    a first terminal for receiving a first signal;
    a second terminal for receiving a second signal; and
    circuitry to generate a reset signal, said reset signal being asserted based on a transition of said second signal when said first signal is in a predetermined state.

2. The integrated circuit of claim 1 wherein said first signal is a first clock signal.

3. The integrated circuit of claim 1 wherein said second signal is a suspend status signal.

4. The integrated circuit of claim 1 wherein:

a resume well comprises said reset circuitry; and said reset signal is used to reset said resume well.

5. The integrated circuit of claim 2 wherein said circuitry comprises synchronous logic responsive to a second clock signal.

6. The integrated circuit of claim 5 further comprising a third terminal for receiving a third clock signal, wherein said circuitry comprises gating logic having a first input coupled to said third clock signal and an output coupled to said second clock signal.

7. The integrated circuit of claim 6 wherein said gating logic also has a second input coupled to said second signal.

8. A computer system comprising:

a clock source generating a first clock signal;

a first integrated circuit generating a suspend status signal; and a second integrated circuit comprising circuitry to generate a reset signal, said reset signal being asserted based on a transition of said suspend status signal when said first clock signal is in a predetermined state.

9. The computer system of claim 8 wherein:

a resume well in said second integrated circuit comprises said circuitry; and said reset signal is used to reset said resume well.

10. The computer system of claim 8 wherein said circuitry comprises synchronous logic responsive to a second clock signal.

11. The computer system of claim 10 wherein said circuitry further comprises gating logic having a first input coupled to a third clock signal and an output coupled to said second clock signal.

12. The integrated circuit of claim 11 wherein said gating logic also has a second input coupled to said second signal.

13. A method of generating a reset signal in an integrated circuit, said method comprising:

receiving a first signal through a first terminal of said integrated circuit;

receiving a second signal through a second terminal of said integrated circuit; and generating a reset signal in said integrated circuit, said reset signal being asserted based on a transition of said second signal when said first signal is in a predetermined state.

14. The method of claim 13 wherein said first signal is a clock signal.

15. The method of claim 13 wherein said second signal is a suspend status signal.

16. The method of claim 13 further comprising a step of using said reset signal to reset a resume well in said integrated circuit.

17. A method of resetting a well in an integrated circuit, said method comprising:

supplying a first signal to said integrated circuit;

supplying a second signal to said integrated circuit;

changing the state of said second signal when said first signal is in a predetermined state to cause circuitry in said integrated circuit to assert a reset signal; and using said reset signal to reset said well.

18. The method of claim 17 wherein said first signal is a clock signal.

19. The method of claim 17 wherein said second signal is a suspend status signal.

20. A method of resuming a computer system comprising an integrated circuit, said method comprising:

supplying power to a resume well in said integrated circuit;

changing the state of a suspend status signal when a clock signal is in a predetermined state to cause circuitry in said integrated circuit to assert a reset signal; and using said reset signal to reset said resume well in said integrated circuit.

* * * * *

UNITED STATES PATENT AND TRADEMARK OFFICE
CERTIFICATE OF CORRECTION

PATENT NO.   : 5,974,561
DATED        : October 26, 1999
INVENTOR(S)  : Kardach et al.

It is certified that error appears in the above-identified patent and that said Letters Patent is hereby corrected as shown below:

Column 4,
Line 54, delete "SUSSTAT# 205", insert -- SUSSTAT3# 205 --.
Line 58, delete "however", insert -- However --.

Column 6,
Line 47, delete "ooes", insert -- goes --.
Line 49, delete "SUSSTAPULSE", insert -- SUSSTATPULSE --.

Column 7,
Line 15, delete "504 however", insert -- 504. However --.
Line 20, delete "SUSCI,K", insert -- SUSCLK --.

Column 8,
Line 16, delete "Going", insert -- going --.

Signed and Sealed this

Twenty-fourth Day of June, 2003

JAMES E. ROGAN
*Director of the United States Patent and Trademark Office*